(12) United States Patent
Schwartz

(10) Patent No.: US 10,267,459 B2
(45) Date of Patent: Apr. 23, 2019

(54) DEVICE FOR PROTECTING A HIGH-PRESSURE GAS TANK IN A MOTOR VEHICLE, HIGH-PRESSURE GAS TANK FOR A MOTOR VEHICLE, AND METHOD FOR THE PRODUCTION OF A HIGH-PRESSURE GAS TANK

(71) Applicant: Bayerische Motoren Werke Aktiengesellschaft, Munich (DE)

(72) Inventor: Christophe Schwartz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 91 days.

(21) Appl. No.: 15/371,739

(22) Filed: Dec. 7, 2016

(65) Prior Publication Data

US 2017/0082245 A1 Mar. 23, 2017

Related U.S. Application Data

(63) Continuation of application No. PCT/EP2015/065177, filed on Jul. 3, 2015.

(30) Foreign Application Priority Data

Jul. 11, 2014 (DE) ........................ 10 2014 213 585

(51) Int. Cl.
F17C 13/12 (2006.01)
(52) U.S. Cl.
CPC ...... *F17C 13/12* (2013.01); *F17C 2201/0109* (2013.01); *F17C 2201/035* (2013.01); *F17C 2201/056* (2013.01); *F17C 2201/058* (2013.01); *F17C 2203/0604* (2013.01); *F17C 2203/066* (2013.01); *F17C 2203/0619* (2013.01); *F17C 2203/0639* (2013.01); *F17C 2203/0646* (2013.01); *F17C 2203/0663* (2013.01);
(Continued)

(58) Field of Classification Search
CPC ........ C09K 21/00; B65D 90/325; F17C 13/12
USPC ..................................... 220/560.01
See application file for complete search history.

(56) References Cited

U.S. PATENT DOCUMENTS 4,085,860 A * 4/1978 Hawkins ................. F16K 17/40
220/89.4
4,784,902 A * 11/1988 Crompton ............... B32B 27/04
442/373

(Continued)

FOREIGN PATENT DOCUMENTS

CA 2151546 A1 12/1995
CN 102792384 A 11/2012
(Continued)

OTHER PUBLICATIONS

Chinese-language Office Action issued in counterpart Chinese Application No. 201580020643.5 dated Jan. 17, 2018 with English translation (Nine (9) pages).

(Continued)

*Primary Examiner* — Shawn M Braden
(74) *Attorney, Agent, or Firm* — Crowell & Moring LLP

(57) ABSTRACT

A device is provided for protecting a high-pressure gas tank in a motor vehicle The device has an intumescent layer which is arranged and designed such that the intumescent layer at least partially shields the high-pressure gas tank. The intumescent layer includes an intumescent metal material.

20 Claims, 2 Drawing Sheets

(52) U.S. Cl.
CPC ........... *F17C 2205/0115* (2013.01); *F17C 2205/0332* (2013.01); *F17C 2209/227* (2013.01); *F17C 2209/232* (2013.01); *F17C 2221/011* (2013.01); *F17C 2221/012* (2013.01); *F17C 2221/013* (2013.01); *F17C 2221/031* (2013.01); *F17C 2221/033* (2013.01); *F17C 2223/0123* (2013.01); *F17C 2223/036* (2013.01); *F17C 2260/042* (2013.01); *Y02E 60/321* (2013.01)

(56) References Cited

U.S. PATENT DOCUMENTS

| | | | |
|---|---|---|---|
| 5,103,996 A * | 4/1992 | McGarvey | B28B 19/0038 220/484 |
| 6,828,026 B2 | 12/2004 | Bretschneider et al. | |
| 7,736,799 B1 * | 6/2010 | Hermann | H01M 2/0257 429/176 |
| 8,043,982 B2 * | 10/2011 | Telander | B32B 5/16 428/911 |
| 8,240,110 B2 * | 8/2012 | Griffiths | E04C 1/42 52/232 |
| 2007/0119604 A1 | 5/2007 | Thompson et al. | |
| 2010/0294761 A1 | 11/2010 | Riordan | |
| 2011/0079403 A1 * | 4/2011 | Lee | A62C 2/065 169/62 |
| 2011/0138748 A1 * | 6/2011 | Olivier | C01B 3/0005 53/435 |
| 2014/0027130 A1 | 1/2014 | Williams et al. | |
| 2015/0008227 A1 | 1/2015 | Villalongaa et al. | |

FOREIGN PATENT DOCUMENTS

| | | |
|---|---|---|
| EP | 0 003 657 A1 | 8/1979 |
| EP | 0 036 284 A2 | 9/1981 |
| EP | 1 640 151 A1 | 3/2006 |
| FR | 2 748 942 A1 | 11/1997 |
| FR | 2 987 367 A1 | 8/2013 |
| GB | 2 016 670 A | 9/1979 |
| GB | 2 038 664 A | 7/1980 |
| WO | WO 2007/044497 A2 | 4/2007 |

OTHER PUBLICATIONS

German-language Office Action issued in counterpart European Application No. 15 735 912.6 dated Jul. 13, 2017 (6 pages).

International Search Report (PCT/ISA/210) issued in PCT Application No. PCT/EP2015/065177 dated Nov. 24, 2015 with English-language translation (six (6) pages).

German-language Written Opinion (PCT/ISA/237) issued in PCT Application No. PCT/EP2015/065177 dated Nov. 24, 2015 (six (6) pages).

German Search Report issued in counterpart German Application No. 10 2014 213 585.0 dated Jan. 16, 2015 with partial English-language translation (twelve (12) pages).

Chinese-language Office Action issued in counterpart Chinese Application No. 201580020643.5 dated Jun. 26, 2018 with English translation (12 pages).

* cited by examiner

Vehicle floor

DEVICE FOR PROTECTING A HIGH-PRESSURE GAS TANK IN A MOTOR VEHICLE, HIGH-PRESSURE GAS TANK FOR A MOTOR VEHICLE, AND METHOD FOR THE PRODUCTION OF A HIGH-PRESSURE GAS TANK

CROSS REFERENCE TO RELATED APPLICATIONS

This application is a continuation of PCT International Application No. PCT/EP2015/065177, filed Jul. 3, 2015, which claims priority under 35 U.S.C. § 119 from German Patent Application No. 10 2014 213 585.0, filed Jul. 11, 2014, the entire disclosures of which are herein expressly incorporated by reference.

BACKGROUND AND SUMMARY OF THE INVENTION

The present invention relates to a device for protecting a high-pressure gas tank of a motor vehicle. High-pressure gas tanks, which are generally also referred to as composite tanks, composite-material tanks, or fiber-composite tanks, typically have fully or partially fiber-reinforced material layers which surround a liner. The liner is often formed from aluminum or steel and accommodates the compressed gases such as, for example, compressed air, oxygen, methane, hydrogen, carbon dioxide, etc. Plastics liners (full-composite tanks) are also known. Such high-pressure gas tanks are employed, for example, in vehicles which are operated with compressed natural gas, often referred to as CNG, or with hydrogen.

When such high-pressure gas tanks are employed there is the risk of the structure of the latter being weakened by the effect of heat. The use of safety valves, so-called thermal pressure release devices (TPRD) is known from the prior art. These safety valves serve as fire protection. The design embodiment of the safety valves or of the fire-protection valves, respectively, is predefined by the standard EC79/2009, for example. In the case of a direct effect of heat (for example by flames) on these safety valves the gas which is stored in the high-pressure gas tank is released to the environment. The safety valves release the gas as soon as a minimum temperature at the safety valve is exceeded. The valves are typically disposed so as to be mutually spaced apart by approx. 1 m along the longitudinal direction of the high-pressure gas tank. The few valves along the large pressure vessels herein may only take into consideration a catchment area which is very limited in spatial terms. A small localized flame which acts on the tank between two valves may thus heavily damage the high-pressure gas tank without the safety installation being activated. The damage to the high-pressure gas tank, or the damage to the load-bearing fiber-composite material, respectively, which is created by the effect of heat of a localized flame may lead to the high-pressure gas tank failing and, in an extreme case, bursting. The high-pressure gas tanks store gases at a pressure of up to 875 bar. Accordingly, bursting of the high-pressure gas tank may lead to very dangerous damage to the entire vehicle. The fiber-composite layers typically bear the major part of the stress. The damage to the fiber-reinforced material layer by thermal or mechanical influences may thus rapidly lead to a significant reduction in the durability, or to a significant weakening, respectively, of the component.

A device in which a layer having a hydrate is disposed above or below a high-pressure gas tank is known from US 2011/0079403 A1. According to US 2011/0079403 A1, these layers are fastened on a panel, so as to be spaced apart from the high-pressure tank. The safety valves and the supply line thereto are disposed between the panel and the high-pressure gas tank. In order for the safety valves and the lines thereof to be fastened, loops around the high-pressure gas tank are provided. The assembly of these safety valves and of the supply line thereto is complex. Furthermore, this embodiment occupies a comparatively large installation space. According to this publication, the tank is protected in that the heat is absorbed in a localized manner by an increase in the volume of the layer containing the hydrate.

It is a preferred object of the technology disclosed herein to reduce or eliminate the disadvantages of the previously known high-pressure gas tanks.

This and other objects are achieved by a device for protecting a high-pressure gas tank of a motor vehicle, for example of a vehicle which may be charged with natural gas or hydrogen. The device has an intumescent layer which at least partially shields the high-pressure gas tank from a source of fire. The intumescent layer furthermore has an intumescent metal material.

Shielding in this context means that the intumescent layer at least partially reduces and/or delays mechanical or thermal influences. In other words, the intumescent layer has the effect that the high-pressure gas tank in that region of the high-pressure gas tank that is shielded by the intumescent layer is not heated as rapidly and/or does not absorb shocks as strongly as in those regions in which the intumescent layer does not shield the high-pressure gas tank. In particular, the thermal shielding effect is such that an effective fire protection, which at least appreciably delays the effect of the fire, is created.

The term intumescent refers generally to the expansion or the swelling, that is to say the increase in size, of a solid body under the influence of temperature. In terms of fire protection, the term refers to the swelling or foaming, respectively, of materials. Intumescent materials thus increase in volume and decrease in density under the effect of heat. Herein, the volume increases significantly, often by a multiple, beyond the usual amount of thermal expansion. The physical properties are significantly modified. For example, an insulation layer is created by the swelling or foaming, respectively.

In the technology disclosed herein, the intumescent layer functions as a heat brake and as mechanical protection. As opposed to metallic foams, hydrates can offer a mechanical protection only to a very minor extent. Moreover, intumescent metal materials, such as intumescent metallic foams, have the advantage that in the non-foamed original state the intumescent metal materials have a thermal conductivity which is comparatively high as opposed to other intumescent materials. If intense heating now arises in a localized manner at any point, for example by a localized flame, this heat is distributed across a comparatively large area of the intumescent metal layer. A more homogenous heating of the intumescent metal material results. The distribution of the locally acting heat across the area initially reduces the speed at which that point on which the heat acts in a localized manner is heated. Furthermore, a metallic foam which then protects the tank across a large area from the local effect of heat may already be built up over a large area even in the case of a small localized effect of heat by a small flame. A further advantage of the comparatively high thermal conductivity in the initial state prior to the increase in volume is to be seen in that the heat effect which is created in a localized manner may be transmitted onward rapidly or more rapidly, respectively, to the nearest safety valve. The safety valve may thus open and release the stored gas more rapidly or earlier, respectively, as compared to the prior art. Moreover, the intumescent metal material may protect the fiber-reinforced material layers from mechanical influences.

The intumescent layer may be fastenable directly to the high-pressure gas tank. For example, the intumescent layer may be adhesively bonded to the high-pressure gas tank, or may be held directly, preferably bear, on the high-pressure gas tank by other fastening measures. In one further design embodiment, the intumescent layer is spaced apart from the outermost layer of the high-pressure gas tank by a minor spacing, for example by less than 5 cm, preferably less than 1 cm. By way of such a design embodiment, the installation space for the high-pressure gas tank in the motor vehicle may be further reduced, for example by 10 to 50 mm. The gap between the intumescent layer and the outermost layer of the high-pressure gas tank represents an additional insulation layer. In particular, the high-pressure gas tank is thus preferably designed in such a manner that the safety valves are not shielded from the flame by the intumescent layer. The responsive behavior of the safety valves may thus advantageously be further improved.

The intumescent metal material preferably has a metal powder and a metal hydride, for example titanium hydride. Furthermore, the intumescent metal material is preferably designed as an intumescent aluminum material. The intumescent aluminum material preferably comprises an aluminum alloy and a propellant. For example, the intumescent layer may be embodied as an aluminum alloy having a titanium hydride propellant. Such aluminum foams under the effect of heat expand by a factor of 4, for example, wherein a foam having a porous structure is created. In the foamed state, the aluminum foams have a density of approx. 0.6 g/cm$^3$, for example. As compared with other intumescent metal materials, the intumescent aluminum material in the non-foamed original state has a lower density. Other metal hydrides may also be used as a propellant. Furthermore, copper, zinc, lead, or steel/iron may also be employed besides aluminum, for example.

The intumescent layer may be embodied as a metal sheet, as a plate, or as a foil. For example, the intumescent layer may at least be partially wrapped as a foil around the high-pressure gas tank. Alternatively and/or additionally, a semi-finished product may be fitted to the tank. Furthermore, the intumescent layer may be configured as a profile of an arcuate cross section, in particular as a C-shaped, or U-shaped, or V-shaped profile, and/or as a tube. The C-shaped design embodiment of the intumescent layer 20 as compared to the intumescent layer which is of a tubular cross section gives rise to the advantage that the weight may be reduced without greatly restricting the protection of the high-pressure gas tank.

Preferably, the high-pressure gas tank is at least partially received in the interior of the intumescent layer. Such a design embodiment is particularly cost-effective in production and has advantageous structural dimensions. The profile which is arcuate in the cross section may enclose at least half, preferably at least 75% of the circumference of the high-pressure gas tank.

The intumescent layer advantageously has a wall thickness of 0.1 mm to 40 mm, preferably of 3 mm to 20 mm, and particularly preferably of 6 mm to 15 mm. Such a design embodiment of the intumescent layer has a favorable ratio of weight to shielding effect, both in mechanical as well as thermal terms.

Advantageously, the intumescent layer expands by at least 1.5 times, preferably by at least 2 times, and particularly preferably by at least 4 times the original wall thickness thereof.

At least one fastener for fastening a safety valve in or to the intumescent layer, respectively, may preferably be provided. For example, the intumescent layer, preferably along the longitudinal axis, may have integrally configured form-fitting structures, for example clamps, bores, threads, and/or inserts, to which the safety valve or safety valves, respectively, are fastenable. By way of this advantageous design embodiment it may be possible to replace the previously employed buckles and, therefore, to achieve fastening of the safety valves, or of the lines leading to the safety valves, respectively, in a cost-effective manner. By direct contact with the intumescent layer, the heat may be transferred by conduction to the safety valve, on account of which the responsive behavior of the safety valve or of the safety valves, respectively, may additionally be improved. The safety valve is preferably disposed on the external side of the intumescent layer. In other words, the liner of the high-pressure gas tank is disposed on the one side of the intumescent layer, and the safety valve is disposed on the other side.

The technology disclosed herein likewise includes a high-pressure gas tank equipped with the device described herein for protecting the high-pressure gas tank.

The high-pressure gas tank preferably has a fiber-reinforced layer. The fiber-reinforced layer may enclose a liner, for example from aluminum, of the tank. CFRP and GFRP are employed as fiber-reinforced plastics. The intumescent layer is advantageously at least partially applied to the external surface of the fiber-reinforced layer.

The technology disclosed herein preferably includes a method for producing the high-pressure tank disclosed herein. The method preferably includes the following acts:
providing a core of a high-pressure gas tank;
providing the intumescent layer; and
at least partially sliding the intumescent layer onto the core, or at least partially wrapping the core with the intumescent layer.

A core of the high-pressure gas tank may preferably be interference fit into the interior of the arcuate profile. Furthermore, the method may advantageously include the act of fastening at least one safety valve to the external surface of the intumescent layer. Here, the core is considered to be the liner of the high-pressure gas tank including any potential additional material layers, for example a fiber-reinforced material layer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
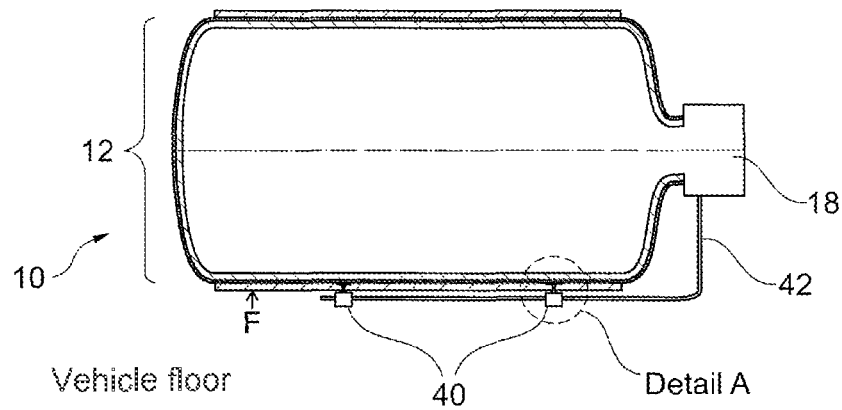
FIG. 1 is a cross-sectional view of a high-pressure gas tank.

FIG. 1 shows a cross-sectional view of the high-pressure gas tank 10. The core 12 of the high-pressure gas tank 10 includes a liner 16, presently for example an aluminum liner 16, and a fiber-reinforced layer 14 which surrounds the liner 16 and increases the strength of the high-pressure gas tank 10. The intumescent layer 20 is applied here to this core 12. The intumescent layer 20 bears directly on the core 12. The intumescent layer 20 is embodied as an intumescent aluminum material. The safety valves 40 are each mutually spaced apart by 1 m along the longitudinal axis of the high-pressure gas tank 10, and are connected to the inlet 18 of the high-pressure gas tank by the connection line 42. The arrow F represents a localized thermal effect of heat which arises so as to be spaced apart from the safety valve 40. Due to the comparatively good thermal conductivity, the incident heat is distributed across the area of the layer 20 and reaches the safety valve 40. The safety valve 40 is then triggered. Furthermore, the layer 20 may increase in volume in a planar manner around the point F, protecting the high-pressure gas tank 10.

Figure 2:
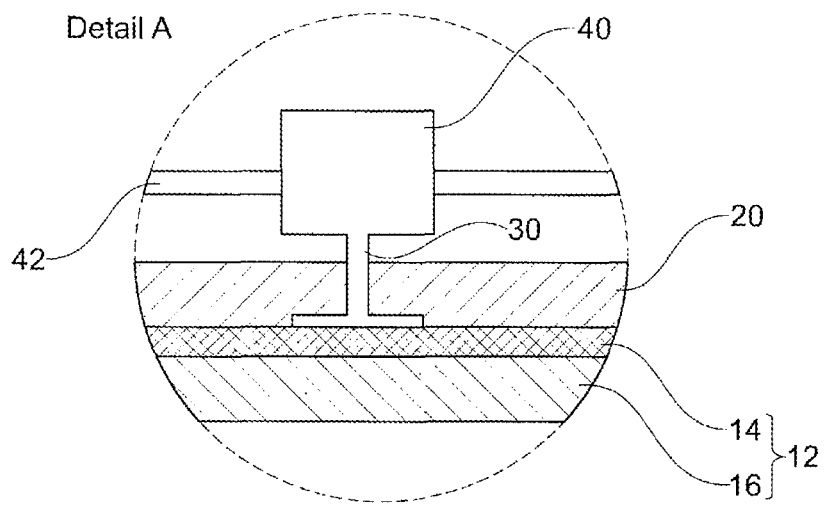
FIG. 2 is an enlarged view of detail A of FIG. 1.

Detail A of FIG. 1 is illustrated in FIG. 2. The layered construction of the high-pressure gas tank 10, including the liner 16, the fiber-reinforced layer 14, and the intumescent layer 20 can be readily identified. The fastener 30 which here is configured as an insert element 30 which is disposed in or below the intumescent layer, respectively, is provided in the intumescent layer 20. Alternatively, other fastening elements or fastening types, respectively, such as a screw connection, for example, are also contemplated. The safety valves 40 may also be fastened to the vehicle sheet metal, for example so as to be adjacent to the high-pressure gas tank 10 in the tunnel 50, and/or to the vehicle underside 52. Mounting the safety valves 40 by way of tension straps is likewise contemplated.

Figure 3:
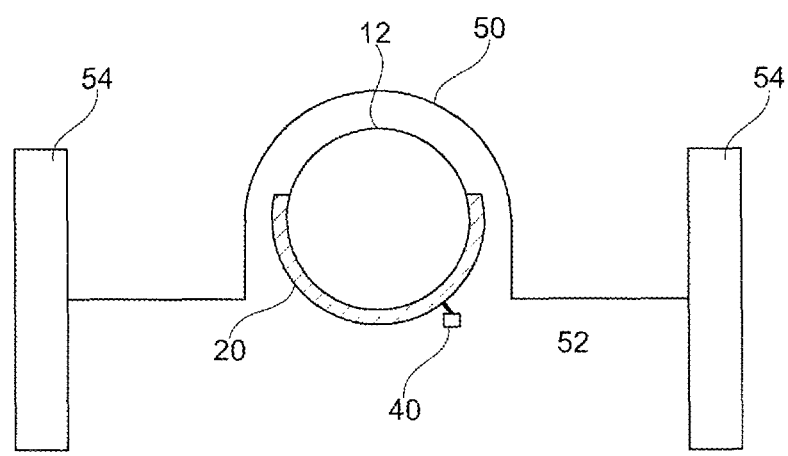
FIG. 3 is a schematic sectional view through a vehicle.

FIG. 3 shows the installation situation of the high-pressure gas tank 10 in a vehicle. The high-pressure gas tank 10 here is disposed between the wheels 54 in a tunnel 50. The intumescent layer 20 here is designed as an arcuate profile which at least partially encloses the core 12 of the high-pressure gas tank 10, here bearing tightly on the core 12. A safety valve 40 which faces the carriageway is visible on the external side of the intumescent layer 20. The intumescent layer 20 protects the high-pressure gas tank 10 from thermal and/or mechanical influences which here are caused by items which are located between the vehicle floor and the roadway, for example.

Furthermore, instead of an intumescent layer 20 which is of a C-shaped cross section or of a tubular shape, an intumescent layer 20 which is designed as a panel which is preferably fastened below the vehicle floor may also be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for protecting a high-pressure gas tank of a motor vehicle, comprising:
    an intumescent layer disposed and configured so as to at least partially shield the high-pressure gas tank, wherein
    the intumescent layer comprises an intumescent metal material and the intumescent metal material is an intumescent metallic foam in a non-foamed original state that has a metal powder and a metal hydride, wherein the intumescent metallic foam foams into a foamed state under an effect of heat.

2. The device according to claim 1, wherein the intumescent layer is fastened directly to the high-pressure gas tank.

3. The device according to claim 2, wherein the intumescent layer at least partially bears on the high-pressure gas tank.

4. The device according to claim 1, wherein the intumescent layer at least partially bears on the high-pressure gas tank.

5. The device according to claim 1, wherein the intumescent metal material is an intumescent aluminum material.

6. The device according to claim 1, wherein the intumescent layer encloses at least half of a cross-section of the high-pressure gas tank.

7. The device according to claim 5, wherein the intumescent layer encloses at least half of a cross-section of the high-pressure gas tank.

8. The device according to claim 1, wherein the intumescent layer is configured to have a C-shaped cross-section in an interior of which the high-pressure gas tank is at least partially receivable.

9. The device according to claim 1, wherein the intumescent layer is configured as a tube in an interior of which the high-pressure gas tank is at least partially receivable.

10. The device according to claim 1, wherein the intumescent layer has a wall thickness of 0.1 mm to 40 mm.

11. The device according to claim 1, wherein the intumescent layer has a wall thickness of 3 mm to 20 mm.

12. The device according to claim 1, wherein the intumescent layer has a wall thickness of 6 mm to 15 mm.

13. The device according to claim 1, wherein the intumescent layer has at least one fastener configured to fasten a safety valve.

14. A tank for a motor vehicle, comprising:
    a high-pressure gas tank for the motor vehicle; and
    a device for protecting the high-pressure gas tank, the device comprising:
        an intumescent layer disposed and configured so as to at least partially shield the high-pressure gas tank, wherein
        the intumescent layer comprises an intumescent metal material and the intumescent metal material is an intumescent metallic foam in a non-foamed original state that has a metal powder and a metal hydride, wherein the intumescent metallic foam foams into a foamed state under an effect of heat.

15. The tank according to claim 14, wherein the high-pressure gas tank comprises a fiber-reinforced layer, wherein the intumescent layer at least partially surrounds the fiber-reinforced layer of the high-pressure gas tank.

16. The tank according to claim 15, wherein the intumescent metal material is an intumescent aluminum material.

17. The tank according to claim 16, wherein the intumescent layer encloses at least half of a cross-section of the high-pressure gas tank.

18. The tank according to claim 14, wherein the intumescent layer has a wall thickness of 0.1 mm to 40 mm.

19. The tank according to claim 14, further comprising a safety valve fastened to the intumescent layer.

20. A method for producing a high-pressure gas tank, the method comprising the acts of:
    providing a core of the high-pressure gas tank;
    providing an intumescent layer having an intumescent metal material wherein the intumescent metal material is an intumescent metallic foam in a non-foamed original state that has a metal powder and a metal hydride, wherein the intumescent metallic foam foams into a foamed state under an effect of heat; and at least partially sliding the intumescent layer onto the core of the high-pressure gas tank or at least partially wrapping the core of the high-pressure gas tank with the intumescent layer.

\* \* \* \* \*